US011883968B2

(12) United States Patent
Braaksma

(10) Patent No.: US 11,883,968 B2
(45) Date of Patent: Jan. 30, 2024

(54) CUTTING LENGTH ADJUSTMENT MECHANISM, ADJUSTMENT DRIVE AND HAIR CUTTING APPLIANCE

(71) Applicant: KONINKLIJKE PHILIPS N.V., Eindhoven (NL)

(72) Inventor: Alle Braaksma, Gorredijk (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 570 days.

(21) Appl. No.: 16/336,209

(22) PCT Filed: Oct. 10, 2017

(86) PCT No.: PCT/EP2017/075723
§ 371 (c)(1),
(2) Date: Mar. 25, 2019

(87) PCT Pub. No.: WO2018/069265
PCT Pub. Date: Apr. 19, 2018

(65) Prior Publication Data

US 2021/0291392 A1 Sep. 23, 2021

(30) Foreign Application Priority Data

Oct. 14, 2016 (EP) .................................... 16194049

(51) Int. Cl.
*B26B 19/02* (2006.01)
*B26B 19/38* (2006.01)
*B26B 19/20* (2006.01)

(52) U.S. Cl.
CPC ............ *B26B 19/20* (2013.01); *B26B 19/388* (2013.01); *B26B 19/3813* (2013.01)

(58) Field of Classification Search
CPC ... B26B 19/20; B26B 19/205; B26B 19/3813; B26B 19/388
See application file for complete search history.

(56) References Cited

U.S. PATENT DOCUMENTS 6,009,623 A 1/2000 Orloff
6,742,262 B2 6/2004 Rizzuto
(Continued)

FOREIGN PATENT DOCUMENTS

EP 2500153 A2 9/2012
WO 2014191184 A1 12/2014
(Continued)

*Primary Examiner* — Jonathan G Riley

(57) ABSTRACT

A cutting length adjustment mechanism for a hair cutting appliance, a hair cutting appliance, a method of operating a cutting length adjustment mechanism for a hair cutting appliance and an adjustment drive for a cutting length adjustment mechanism for a hair cutting appliance wherein the adjustment drive includes an actuator that is configured to actuate a movable portion of the cutting length adjustment mechanism with respect to a housing portion of the hair cutting appliance, and a movement sensor unit that is configured to detect a movement of the hair cutting appliance, the movement involving at least one of an orientation change and a position change. The actuator is further configured to output an adjustment control signal that is derived from the detected movement. In a length adjustment mode, the actuator is operated on the basis of the adjustment control signal.

15 Claims, 5 Drawing Sheets

(56) References Cited

U.S. PATENT DOCUMENTS

| | | | | |
|---|---|---|---|---|
| 6,968,623 | B2 | 11/2005 | Braun | |
| 8,367,974 | B2 | 2/2013 | Azar | |
| 8,863,427 | B2 | 10/2014 | Chiang | |
| 10,933,546 | B2 * | 3/2021 | Lauritsen | A45D 24/36 |
| 2008/0163495 | A1 * | 7/2008 | Smal | B26B 19/382 30/233 |
| 2009/0000124 | A1 | 1/2009 | Micinilio | |
| 2015/0197016 | A1 * | 7/2015 | Krenik | B26B 19/388 83/13 |
| 2015/0321365 | A1 * | 11/2015 | Lauritsen | B26B 19/388 83/75.5 |
| 2016/0297085 | A1 * | 10/2016 | Uit De Bulten | B26B 21/4056 |
| 2017/0072577 | A1 * | 3/2017 | Darwinkel | B26B 19/388 |
| 2017/0305020 | A1 | 10/2017 | Darwinkel | |

FOREIGN PATENT DOCUMENTS

| | | | |
|---|---|---|---|
| WO | 2015068068 | A1 | 5/2015 |
| WO | 2015169553 | A1 | 11/2015 |
| WO | 2016041929 | A1 | 3/2016 |
| WO | 2016113202 | A1 | 7/2016 |

* cited by examiner

CUTTING LENGTH ADJUSTMENT MECHANISM, ADJUSTMENT DRIVE AND HAIR CUTTING APPLIANCE

This application is the U.S. National Phase application under 35 U.S.C. § 371 of International Application No. PCT/EP2017/075723, filed on Oct. 10, 2017, which claims the benefit of International Application No. 16194049.9, filed Oct. 14, 2016. These applications are hereby incorporated by reference herein.

FIELD OF THE INVENTION

The present disclosure relates to an adjustment drive for a cutting length adjustment mechanism for a hair cutting appliance, wherein the adjustment drive comprises an actuator that is configured for actuating a movable portion of the cutting length adjustment mechanism with respect to a housing portion of the hair cutting appliance. The present disclosure further relates to a cutting length adjustment mechanism comprising such an adjustment drive and to a hair cutting appliance that comprises such a cutting length adjustment mechanism.

In exemplary embodiments, the present disclosure relates to an adjustment drive for an adjustable spacing comb for a hair cutting appliance. In further exemplary embodiments, the present disclosure relates to an adjustment drive for an adjustable blade set of a hair cutting appliance, wherein a tip-to-tip distance of a movable blade (cutter blade) and a stationary blade (guard blade) is adjustable which results in a cutting length adjustment.

Further, the disclosure relates to a method of operating a cutting length adjustment mechanism for a hair cutting appliance.

BACKGROUND OF THE INVENTION

Hair cutting appliances, particularly electric hair cutting appliances, are generally known and may include trimmers, clippers and shavers, for instance. Electric hair cutting appliances may also be referred to as electrically powered hair cutting appliances. Electric hair cutting appliances may be powered by electric supply mains and/or by energy storages, such as batteries, for instance. Electric hair cutting appliances are generally used to trim (human) body hair, in particular facial hair and head hair to allow a person to have a well-groomed appearance. Frequently, electric hair cutting appliances are used for cutting animal hair.

U.S. Pat. No. 6,968,623 B2 discloses a hair trimmer comprising a body, a cutting head including a blade set, an adjustable comb, wherein the comb is movable with respect to the blade set, an electric motor for driving the blade set to effect a cutting action, and an actuator assembly that is capable of moving the comb with respect to the blade set between a fully retracted position and a fully extended position, the actuator assembly comprising a comb carriage, a comb button connected to the comb carriage, wherein the comb button is actuable to adjust the position of the comb relative to the blade set, and a lock button movable with respect to the comb button, wherein the lock button selectively prevents and permits movement of the comb button relative to the body. Consequently, manual adjustment of the length of the comb is enabled.

EP 2 500 153 A2 discloses a hair grooming appliance comprising a housing; at least one hair grooming device carried by the housing and adapted to facilitate grooming of hair, said at least one hair grooming device comprising a blade selectively movable with respect to the housing and adapted to cut hair; an adjustable comb assembly including a comb selectively movable relative to the blade, and a comb-driving assembly operatively coupled to the comb; a control circuit in the housing and in communication with said at least one hair grooming device; and a touchscreen for receiving at least one input from a user, the touchscreen being configured to send at least one command signal to the control circuit in response to receiving said at least one input from the user, wherein the control circuit is configured to control an operation of the adjustable comb assembly, and wherein the operation of the adjustable comb assembly includes the comb-driving assembly moving the comb relative to the blade to a selected hair cut-length setting of the hair grooming appliance.

A comb for a hair cutting appliance, particularly a spacing comb, generally may be arranged as an attachable comb or an integrally formed comb. A spacing comb generally spaces a blade set of the hair cutting appliance from the skin when the appliance is moved in a moving direction with respect to the skin during operation. Consequently, the spacing comb may enable to cut hair to a desired length, i.e. to a desired length of remaining hair at the skin.

Conventional hair cutting appliances may be fitted with a set of attachment combs, each of which associated with a distinct hair length. Consequently, a user of the appliance basically needs to replace an attachment comb by another one to alter the hair cutting length. Furthermore, manually adjustable comb attachments are known, as disclosed in U.S. Pat. No. 6,968,623 B2. Furthermore, also powered adjustment combs have been presented in recent years, as for instance disclosed in EP 2 500 153 A2. Typically, powered adjustment combs comprise a movable comb portion that is movable with respect to a blade set of the hair cutting appliance, wherein the movable comb portion is coupled to an actuator, particularly to an electromotor and/or an electric powertrain.

However, operating a motorized adjustment comb frequently has proven to be afflicted with several drawbacks. It is often cumbersome for the user to operate the adjustable spacing comb in a precise and accurate manner since typically rather conventional control elements are provided, for instance push buttons, control levers etc. Typically, these control elements provide a predefined user input sensitivity. In other words, a single user input action may cause a defined response of the motor such that the adjustable spacing comb is displaced by a defined distance or step. Basically the same applies to conventional touchscreens, as shown in EP 2 500 153 A2.

Consequently, coarsely positioning the adjustable spacing comb in the provided adjustment range (which may include covering considerably long distances in the adjustment range) may be experienced as time-consuming. Furthermore, fine adjustment of the adjustable spacing comb may be difficult since conventional control elements typically require considerably large minimum increments of the adjustment motion, as indicated above. Consequently, operating a motorized adjustable spacing comb by means of conventional control elements may be regarded as a compromising trade-off between adjustment speed and adjustment precision.

Due to the above-mentioned lack of operating and adjusting efficiency of conventional adjustable spacing comb arrangements, operating the hair cutting appliance may be further complicated. It would be therefore advantageous to simplify the act of adjusting the spacing comb. It would be further advantageous to provide an adjustable spacing comb and an adjustment drive therefor that may be operated by the user in a time-efficient and highly accurate manner.

As already indicated above, also so-called tip-to-tip adjustment mechanisms are known that are arranged to move a first blade of a blade set (e.g. a guard blade) with respect to a second blade of the blade set (e.g. a cutter blade) in a direction (e.g. longitudinal direction) basically perpendicular to a direction (e.g. lateral direction) of the relative cutting movement therebetween when the blade set is operated. In such an arrangement, typically the guard blade is at least partially tapered in the longitudinal direction such that a relative movement between the tips of the blades causes a cutting length adjustment. In this context, U.S. Pat. No. 6,742,262 B2 discloses a hair clipper comprising a body with a tongue structure pivotally mounted to and supported by said body; a blade assembly detachably securable to said body and having at least a stationary blade and a reciprocating blade, each blade having a cutting edge; an actuator; and a control lever operatively connected to said actuator, wherein when said control lever is rotated, said actuator causes said cutting edge of said reciprocating blade to move relative to said cutting edge of said stationary blade so as to allow the hair cutting length to be adjusted, wherein said blade assembly has a pocket structure with a bracket for selectively and detachably engaging said tongue structure and thereby enabling said blade assembly to be detachably secured to said body.

There is thus still room for improvement in length adjustment mechanisms for hair cutting appliances and in controls therefor.

SUMMARY OF THE INVENTION

It is an object of the present disclosure to provide a hair cutting appliance, a cutting length adjustment mechanism for a hair cutting appliance, and an adjustment drive for such a cutting length adjustment mechanism that address and that may overcome at least some of the above-mentioned issues. In particular, it is an object to provide an adjustment drive for a cutting length adjustment mechanism that may ensure simplified operability and, more preferably, extended input options for a user. It would be further beneficial to seek for improvements in adjustment speed and adjustment precision and accuracy. It would be further advantageous to reduce the number of required controls. It would be further advantageous to provide a corresponding method for operating a cutting length adjustment mechanism.

In a first aspect of the present disclosure, an adjustment drive for a cutting length adjustment mechanism for a hair cutting appliance is presented, the adjustment drive comprising:

- an actuator that is configured to actuate a movable portion of the cutting length adjustment mechanism with respect to a housing portion of the hair cutting appliance, and
- a movement sensor unit that is configured to detect a movement of the hair cutting appliance, involving at least one of an orientation change and a position change, and to output an adjustment control signal that is derived from the detected movement,
- wherein, in a length adjustment mode, the actuator is operated on the basis of the adjustment control signal.

This aspect is based on the insight that the appliance as such may be used as a controller for controlling the adjustment procedure of the cutting length adjustment mechanism. Similar control mechanisms are, for instance, known in the field of entertainment electronics, game consoles, and particularly involving wand-shaped controllers for motion-sensing based game control.

However, in accordance with the present disclosure which pertains to the field of hair cutting appliances, an inherent function of the cutting length adjustment mechanism, e.g. the comb adjustment or the tip-to-tip adjustment, is controlled by moving the appliance as such and not an additional controller.

As already indicated, a mechanism in accordance with the above aspect may be implemented in an adjustable spacing comb arrangement for hair cutting appliances. Further, a mechanism in accordance with the above aspect may be implemented in an adjustable blade set arrangement for hair cutting appliances, wherein the guard blade (stationary blade) is movable with respect to the cutter blade (movable blade), for instance, to cause a certain distance setting between the tips of the blade. As used herein, the designations movable blade and stationary blade relate to the cutting movement of the blade set, i.e. the relative movement between the blades of the blade set, typically involving the guard blade and the cutter blade.

Generally, a potential length adjustment range provided by an adjustable spacing comb is greater than a potential length adjustment range provided by a blade set having a tip-to-tip length adjustment feature.

Needless to say, both aspects may be combined to provide both a coarse length setting and a fine length setting, for instance.

A main benefit of the above presented approach is that no additional control element or input element is required as the appliance as such is the controller. It is recalled in this context that, at least in some embodiments, the hair cutting appliance is configured for being operated in wet environments. Therefore, any explicit, separate control element that is arranged at a housing of the hair cutting appliance requires a sealing, or similar waterproofing measures. By contrast, respective sensors of the movement sensor unit may be arranged in the interior of a housing of the hair cutting appliance. Consequently, no additional waterproofing measures, sealing arrangements, etc. are required for the sensors as such.

A further advantage of the above aspect is that a huge degree of freedom of movement of the appliance is potentially available for detecting operator inputs. For instance, relative and/or absolute movement and/or orientation changes along/about not less than six axes are potentially detectable, provided that respective sensors are implemented. Further, also accelerations/decelerations of the respective movements/orientation changes may be detected. Hence, a finely graduated adjustment operation may be enabled. For instance, a present speed or rate of acceleration/deceleration may be transferred to a corresponding adjustment speed and/or adjustment increment. Therefore, a rapid, harsh movement or orientation change of the appliance may induce a coarse adjustment of the spacing comb, while a slow, subtle movement or orientation change may induce a small adjustment speed and/or adjustment increment of the adjustment operation.

As used herein, a movement of the hair cutting appliance may be composed of at least one of a position change and an orientation change. Typically, a position change involves a displacement of the appliance along at least one axis. Typically, an orientation change involves a rotation of the appliance about at least one axis. Consequently, the detected movement may involve a combined overall movement of the entire appliance. However, depending on a present configuration of the sensor unit and the adjustment drive, isolated movements may be detected which may involve that different or deviating movements are not used for controlling the adjustment procedure. Consequently, the detection of isolated movements may enable a clear and unambiguous operation of the adjustable spacing comb.

The adjustment drive may comprise or may be coupled to a mode control element that is operable to set the adjustment drive into the length adjustment mode. Hence, the appliance may be operated in a normal or standard mode involving a cutting action and in a length adjustment mode, wherein in the standard mode an overall movement or orientation change of the appliance does not trigger an adjustment operation.

In accordance with an exemplary embodiment of the adjustment drive, the movement sensor unit comprises at least one movement sensor, particularly at least one of an accelerometer sensor or a gyroscope sensor.

Consequently, the movement sensor unit may be capable of detecting relative and/or absolute movements of the appliance. The at least one movement sensor may be arranged as a multi-axes sensor that is capable of detecting translational and/or rotational movements along/about more than just one axis. In certain embodiments, six movement axes may be present including three translational axes and three rotational axes. However, at least in some embodiments, a movement sensor or a set of movement sensors may be used which is/are capable of detecting movements with respect to only one movement axis.

Further, the at least one movement sensor may be capable of detecting orientation changes in a mediate or direct fashion. Hence, movements and/or orientation changes within a one-dimensional space, a two-dimensional space or even a three-dimensional space may be detected. In other words, the movement sensor unit may involve an electronic “level” or “spirit/bubble level” that indicates a current orientation of the appliance with respect to a gravity field.

In accordance with a further exemplary embodiment of the adjustment drive, the movement sensor unit is arranged to detect at least one of an absolute orientation change and an absolute position change of the hair cutting appliance with respect to an overall reference frame, particularly with respect to a gravity system.

In accordance with a further exemplary embodiment, the movement sensor unit is arranged to detect a relative orientation change or position change of the hair cutting appliance with respect to a previously assumed orientation or position.

Depending on the type of sensor that is implemented and/or the algorithm that is used for the movement detection, absolute movements and/or relative movements may be detected. Needless to say, a combined basically free multi-axes movement may be detected which involves orientation changes and position changes.

Further, the movement sensor unit may be capable of detecting both absolute and relative movements. Detecting relative movements may be based on acceleration detection.

In accordance with a further exemplary embodiment, the movement sensor unit is arranged to detect at least one of a pitch movement, a roll movement and yaw movement of the hair cutting appliance. In certain embodiments, a roll axis is aligned with a main elongation direction of the hair cutting appliance. In certain embodiments, a pitch axis is perpendicular to the roll axis and basically parallel to a leading edge of the blade set hair cutting appliance. In certain embodiments, a yaw axis is perpendicular to the roll axis and perpendicular to the pitch axis.

More generally, in certain embodiments, the movement sensor unit is arranged to detect a movement, particularly a rotational movement, of the hair cutting appliance about a defined axis. Needless to say, even movements with respect to a single axis may sufficiently control the adjustment procedure. Hence, not necessarily in each case the above three axes roll axis, pitch axis and yaw axis have to be defined. In certain embodiments, a back and forth movement of the appliance about a pitch axis that is parallel to a leading edge defined by a series of teeth of the blade set or the spacing comb may be used as a clear indication of a desired adjustment operation.

The above introduced main elongation direction may correspond to a main extension of the housing of the appliance or may be at least somewhat approximate thereto. Further, the above introduced leading edge may be referred to as cutting edge. The leading edge may be defined by a connecting line that connects the frontal tips of a plurality of teeth of a blade set of the appliance, i.e. the cutter blade and/or the movable blade.

When an additional comb is provided, also the tips of the teeth thereof may be connected by a connecting line that is parallel to the leading edge. When a tip-to-tip distance adjustment feature is provided, each of the cutter blade and the guard blade may define a respective leading edge that connects the frontal tips of the teeth thereof. Hence, there may be a parallel offset between the guard blade leading edge and the cutter blade leading edge which, however, does not interfere with the above definition of the pitch axis.

Generally, the roll axis may be referred to as longitudinal axis. Typically, the longitudinal axis is associated with a main extension of the housing of the appliance (e.g. a housing length extension). Further, the pitch axis may be referred to as a lateral axis. The pitch axis may be associated with a second largest extension of the housing of the appliance (e.g. a housing width extension). Further, the yaw axis may be referred to as height axis and may be associated with the shortest extension of the housing of the appliance (e.g. a housing height extension).

Further definitions of the axes underlying the movement detection may be envisaged and may be readily transferred by the person skilled in the above. The above conventions therefore shall not be understood in a limiting sense.

For instance, the pitch axis may be defined as an axis that is perpendicular to an adjustment movement direction axis of the adjustable spacing comb. Typically, the adjustable spacing comb is longitudinally movable. The movement axis for the adjustment movement may be referred to as roll axis. A remaining axis that is perpendicular to both the pitch and the roll axis may be referred to as yaw axis. In accordance with the frameworks or conventions discussed herein, a rotation of the appliance about the pitch axis allows for a somewhat intuitive adjustment operation.

In accordance with a further exemplary embodiment, a forward rotation of the hair cutting appliance induces a length enlargement, and wherein a rearward rotation of the hair cutting appliance induces a length reduction. This preferably applies to the length adjustment mode.

As a result, the adjustment drive is considerably easy to operate. In certain embodiments, a forward rotation is a tip-down movement. Consequently, a rearward rotation is a tip-up movement. The forward rotation and the rearward rotation may take place about a pitch axis of the appliance. Typically, the rearward and forward rotation of the hair cutting appliance can be performed by a movement of the wrist of the hand in which the appliance is held in a grasp orientation that corresponds to a standard (hair cutting) grasp orientation of the appliance in the user's hand.

More generally, a first rotation direction of the overall rotation of the appliance about the pitch axis may induce an extraction of the adjustable comb, wherein a second rotation direction that is opposite to the first rotation direction induces a retraction of the adjustable comb.

In accordance with a further exemplary embodiment, a detected speed of rotation of the hair cutting appliance determines at least one of an adjustment speed and a length adjustment increment of the length adjustment operation.

In accordance with a further exemplary embodiment, a detected rotation angle of the hair cutting appliance determines at least one of an adjustment speed and a length adjustment increment of the length adjustment operation.

Also a rotation path or angle may be used to determine length adjustment settings. For instance, a certain rotation angle may determine a certain displacement path of the length adjustment drive.

Hence, not only the result of the movement of the hair cutting appliance but also actual movement characteristics may be detected and used for controlling the adjustment operation. For instance, when a user is quickly rotating the appliance, i.e. when a considerably huge angular velocity is present, the adjustment operation may involve a high adjustment speed. The same may apply when a certain angular acceleration is detected.

By contrast, when a user is slowly moving the appliance, the adjustment operation may involve a low adjustment speed. A slow movement of the appliance may involve a low angular velocity and/or angular acceleration.

Hence, a quick movement may induce a coarse adjustment and/or large adjustment increments. Further, a slow movement may induce a fine adjustment and/or small adjustment increments.

As a consequence, diverse or multiple adjustment modes may be used, while operating the adjustment drive is still simple and intuitive. Diverse adjustment modes may include a setting of the adjustment direction and an adaption of the adjustment speed in response to detected movement directions and further characteristics.

In accordance with a further exemplary embodiment, length adjustment settings are assigned to rotation orientation states of the hair cutting appliance.

By way of example, a defined convention or correlation between operator input operations and resulting adjustment operations may be established. For instance, an input rotation angle and a resulting length setting may be linked with one another. Similarly, a link between an (absolute and/or relative) input rotation position and a resulting length setting may be established. The correlation between input values and adjustment control settings may be defined in a lookup table or a similar data set. In the alternative, a functional relation between a user input and a resulting output control value may be defined. More generally, a set of inputs and a resulting set of associated outputs connected with the input values may be provided.

In accordance with a further exemplary embodiment, the adjustment drive further comprises a control unit for controlling the operation of the adjustment drive, wherein the control unit is configured to convert the adjustment control signal into an actuator operating signal.

The control unit may be for instance configured to operate a motor of the adjustment drive. By controlling at least one of an operating time and/or an operating speed of the motor for the adjustment drive, a length adjustment operation may be performed.

In a further aspect of the present disclosure, there is presented a cutting length adjustment mechanism for a hair cutting appliance, comprising a movable portion that is movable with respect to a housing portion of the hair cutting appliance, and an adjustment drive in accordance with at least on exemplary embodiment as discussed herein.

Generally, the spacing comb may be arranged as an attachable and detachable spacing comb. In the alternative, the spacing comb may be arranged as an integrated or integrally provided spacing comb that cannot be detached from the hair cutting appliance. The movable comb portion may comprise a plurality of comb teeth that may divide and guide hairs when the hair cutting appliance including the adjustable spacing comb is moved through hair to cut hair to a selected length. The teeth of the movable comb portion may define, at their tips, a frontal leading edge.

In yet another aspect of the present disclosure, a hair cutting appliance, particularly a hair trimmer or clipper, is presented, the hair cutting appliance comprising a housing portion, a cutting unit including a blade set, and a cutting length adjustment mechanism in accordance with at least one exemplary embodiment as described herein. Generally, the hair cutting appliance may be regarded as an electrically powered hair cutting appliance. Consequently, a motor may be provided for driving the blade set. Typically, the blade set may comprise a stationary blade and a movable blade, wherein the movable blade is movable with respect to the stationary blade. The movable blade may be driven with respect to the stationary blade, particularly oscillatingly driven. The movable blade and the respective stationary blade may comprise cutting edges that may cooperate to cut hair.

Generally, the hair cutting appliance may comprise an elongated housing comprising a first end and a second end which is opposite to the first end. At the first end of the housing, a cutting head may be arranged. The second end of the housing may also be referred to as handle end.

In accordance with an exemplary embodiment, the hair cutting appliance further comprises a mode control element that is actuable to set the adjustment drive into the length adjustment mode The mode control element may involve a mode control switch or a similar control element. In at least some embodiments, the mode control element may be also used to confirm a length adjustment. Hence, the adjustment drive may be set into the length adjustment mode and into a standard (hair cutting) operation mode by the mode control element. For instance, the mode control element may involve a discrete push button, a proximity sensor, a touch sensor, and similar controls.

Hence, it is clear whether the appliance is operated in the length adjustment mode or in a standard operation mode. In the length adjustment mode, respective movements of the appliance induce a length adjustment operation.

In an exemplary embodiment of the hair cutting appliance, the mode control element is inconspicuously integrated in the housing portion. This may involve that the mode control element is hidden in the housing portion. Preferably, the mode control element, particularly a touch-sensitive or proximity-sensitive portion thereof, is covered by a wall of the housing portion. This may be advantageous since in this way an integrally shaped housing portion may be provided that exhibits a reduced tendency for soiling and dirt deposits. Also the mode control element may be arranged in a waterproof fashion.

In accordance with a further exemplary embodiment of the hair cutting appliance, the movement sensor unit is operable to detect a free rotation of the hair cutting appliance about a central portion of the housing portion.

Typically, the appliance is moved in a state grasped by a user's hand that is similar to or corresponds to a standard operation grasp orientation and position assumed when processing hair with the appliance. Therefore, a control movement of the appliance typically involves a wrist movement and/or a combined wrist/finger movement. Typically, a handle portion is defined at the housing of the appliance which may also cover a central portion. The central portion may involve a geometric center and/or a mass center. Hence, the central portion may form a center of an imaginary coordinate system that is used for describing the movements of the appliance. As indicated above, the coordinate system may include a roll axis, a pitch axis, and a yaw axis.

In a further aspect of the present disclosure, there is provided a method of operating a cutting length adjustment mechanism for a hair cutting appliance, the method comprising the following steps:

- providing an adjustment drive comprising an actuator for actuating a movable portion of the cutting length adjustment mechanism,
- providing a movement sensor unit that is configured to detect a movement of the hair cutting appliance, involving at least one of an orientation change and a position change,
- detecting a movement of the hair cutting appliance,
- generating and outputting a respective adjustment control signal, and
- operating the actuator on the basis of the adjustment control signal.

Preferably, the method can make use of the adjustable spacing comb and the adjustment drive as discussed herein. Preferred embodiments of the disclosure are defined in the dependent claims. It shall be understood that the claimed method has similar and/or identical preferred embodiments as the claimed device and as defined in the dependent claims.

Further, certain embodiments may be envisaged that include arrangements in accordance with two or more of the exemplary embodiments discussed herein. Hence, the features of one or more embodiments may be incorporated in a combined arrangement which is still covered by the scope of the present disclosure.

BRIEF DESCRIPTION OF THE DRAWINGS

These and other aspects of the disclosure will be apparent from and elucidated with reference to the embodiments described hereinafter. In the following drawings

DETAILED DESCRIPTION OF THE EMBODIMENTS

Figure 1:
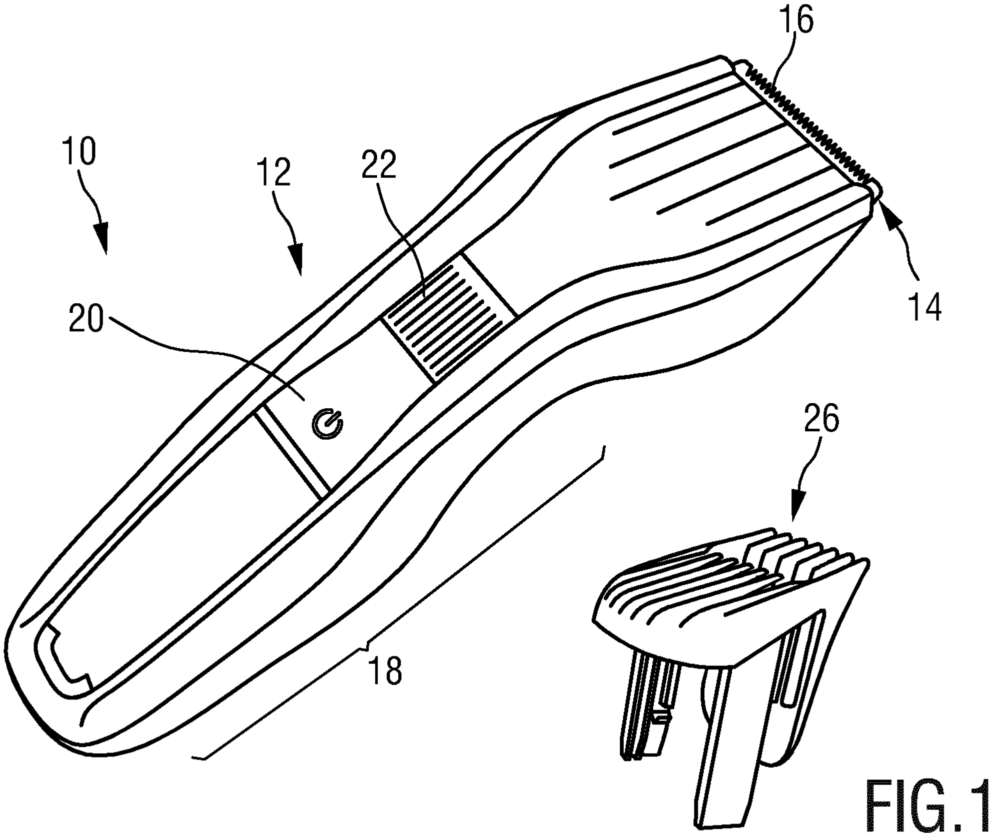
FIG. 1 shows a schematic perspective view of an exemplary embodiment of an electric hair cutting appliance and an adjustable spacing comb, wherein the spacing comb is shown in a detached state.

With reference to FIGS. 1 to 5, certain embodiments that relate to adjustable spacing combs will be elucidated and further detailed. As the present disclosure generally relates to cutting length adjustment mechanisms, further embodiments may be envisaged that comprise length adjustment features for the blade set itself, e.g. a so-called tip-to-tip adjustment. In this context, reference is made to FIGS. 6 and 7 discussed further below. FIG. 1 shows a schematic perspective view of a hair cutting appliance 10, particularly an electrically-operated hair cutting appliance 10. The hair cutting appliance 10 may also be referred to as hair clipper or hair trimmer. The hair cutting appliance 10 may comprise a housing or housing portion 12 having a generally elongated shape. At a first end thereof, a cutting unit 14 may be provided. The cutting unit 14 may comprise a blade set 16. The blade set 16 may comprise a movable blade and a stationary blade that may be moved with respect to each other to cut hair. At a second end of the housing portion 12, a handle or grip portion 18 may be provided. A user may grasp or grab the housing at the grip portion 18.

The hair cutting appliance 10 may further comprise operator controls. For instance, an on-off switch or button 20 may be provided. Furthermore, a length adjustment control 22 may be provided at the housing 12 of the hair cutting appliance 10. The length adjustment control 22 may be provided in case an adjustable spacing comb 26 is attached to the housing portion 12 of the hair cutting appliance 10. In FIG. 1, the adjustable spacing comb 26 is shown in a detached or released state. When the spacing comb 26 is detached from the hair cutting appliance 10, a minimum cutting length may be achieved. When the spacing comb 26 is attached to the hair cutting appliance 10, hairs can be cut to a desired length.

In certain embodiments as disclosed herein, a cutting length adjustment mechanism 24 is provided that may be arranged as an adjustable spacing comb 26, in accordance with the embodiments illustrated in FIGS. 1 to 5.

Figure 2:
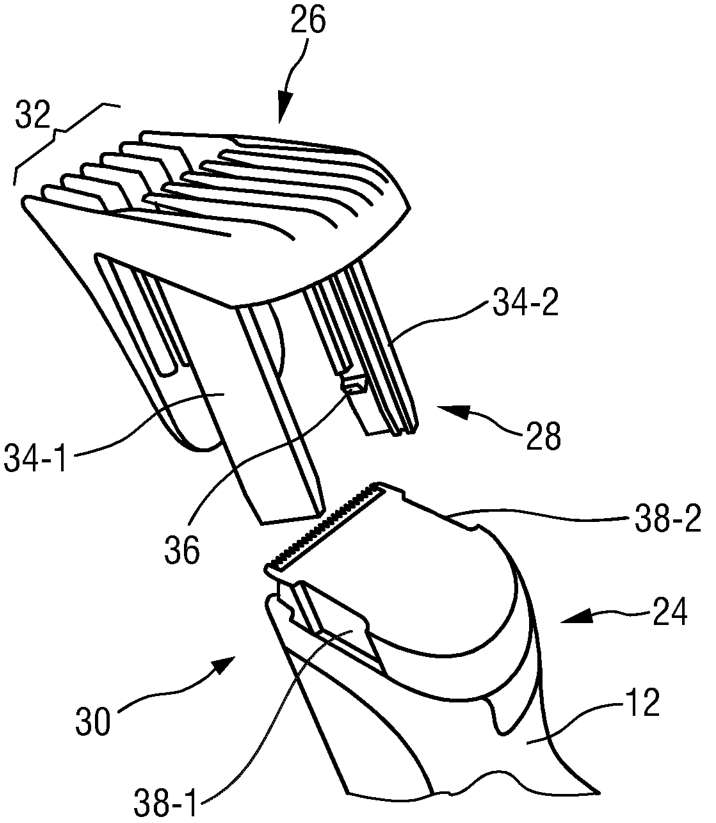
FIG. 2 shows a partial exploded view of an exemplary embodiment of a hair cutting appliance and an adjustable spacing comb, wherein the spacing comb is shown in an insertion orientation.

FIG. 2 shows a partial perspective schematic illustration of a first end of a housing portion 12 of a hair cutting appliance 10. Furthermore, an adjustable spacing comb 26 is shown in an insertion orientation with respect to the housing portion 12. The housing portion 12 and the adjustable spacing comb 26 are shown in an exploded state. By way of example, the spacing comb 26 may comprise an attachment portion 28 which may comprise, for instance, sliding beams 34-1, 34-2. The attachment portion 28 may engage the housing portion 12. More particularly, the attachment portion 28 may be attached to a mounting portion 30 of the housing portion 12. To this end, the sliding beams 34-1, 34-2 may be inserted into respective mounting slots 38-1, 38-2 at the mounting portion 30. The attachment portion 28 may further comprise at least one snap-on member 36 which may be provided at at least one of the sliding beams 34-1, 34-2, for instance. The snap-on member 36 may secure the spacing comb 26 in its mounted state.

As can be further seen from FIG. 2, the spacing comb 26 may further comprise a toothed portion 32 including a plurality of comb teeth. Generally, the toothed portion 32 may comprise a slot in which the blade set 16 can be arranged in the attached state.

Figure 3:
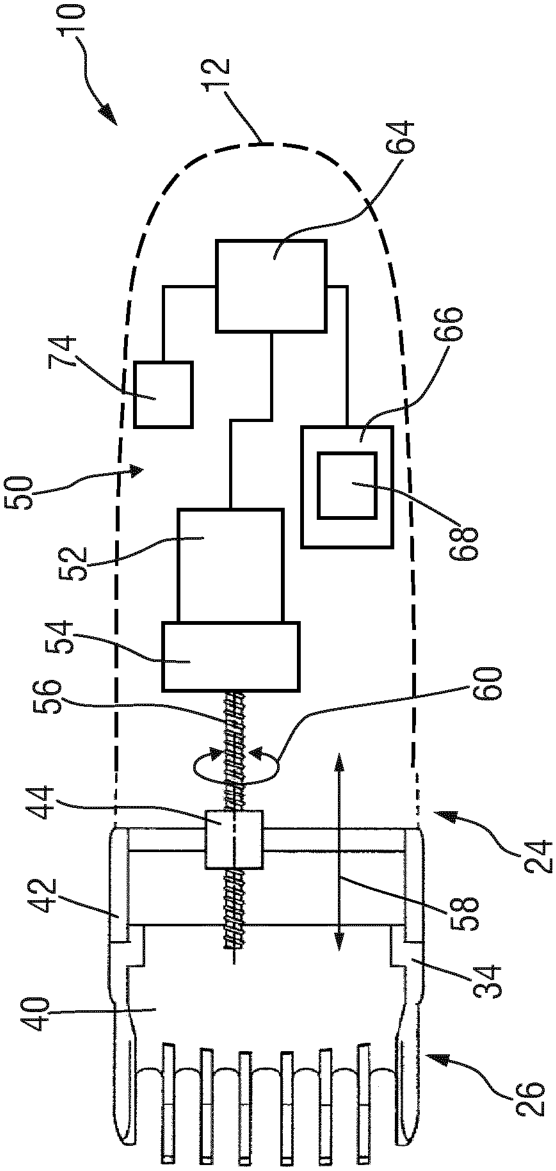
FIG. 3 shows a simplified top view of an exemplary embodiment of a hair cutting appliance fitted with an adjustable spacing comb and an adjustment drive for the spacing comb.
Figure 4:
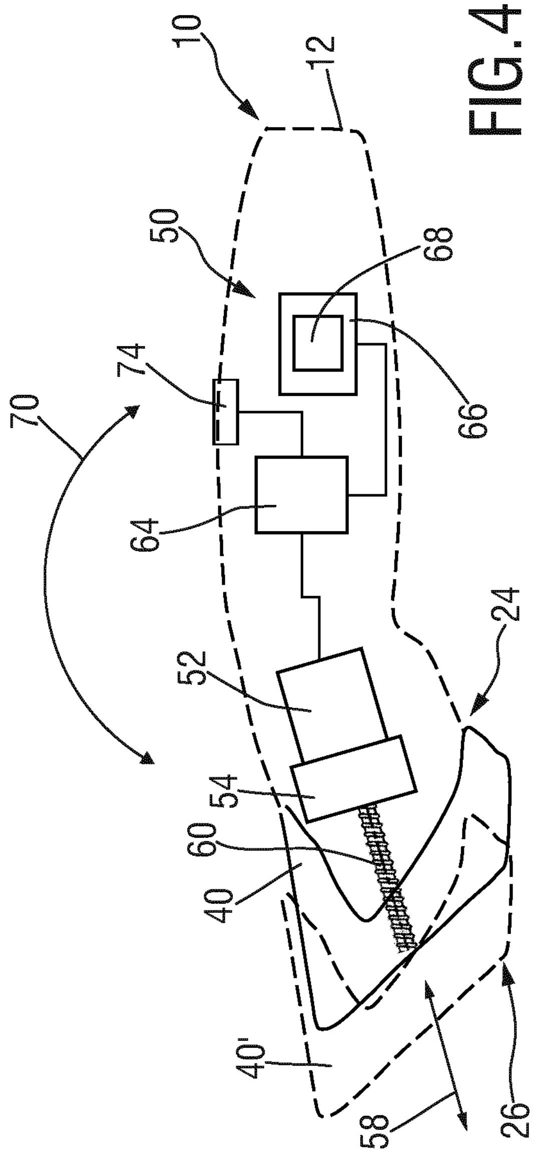
FIG. 4 shows a schematic simplified side view of an exemplary embodiment of a hair cutting appliance fitted with a retractable spacing comb and an adjustment drive for adjusting the spacing comb.

With further reference to FIG. 3 and FIG. 4, an exemplary embodiment of an adjustable spacing comb 26 and an embodiment of an exemplary adjustment drive 50 for operating the spacing comb 26 are further illustrated and described. FIG. 3 shows a schematic elevated view of a hair cutting appliance 10. FIG. 4 shows a schematic side view of a hair cutting appliance 10. It is worth mentioning in this regard that the views shown in FIG. 3 and FIG. 4 do not necessarily represent the same arrangement or embodiment. Respective housing portions 12 of the hair cutting appliance 10 are indicated in FIG. 3 and FIG. 4 by dashed lines. Consequently, internal components of the hair cutting appliances 10 are visible.

With particular reference to FIG. 3, the adjustable spacing comb 26 is further described. The adjustable spacing comb 26, refer also to FIG. 1 and FIG. 2, may comprise sliding beams 34 that may cooperate with a carriage 42 that is arranged at the housing 12. Generally, a snap-on mounting of the sliding beams 34 at the carriage 42 may be provided. At least a substantial portion of the spacing comb 26 may be regarded as movable comb portion 40. As can be best seen in FIG. 3, the movable comb portion 40 may be coupled to the carriage 42 and, consequently, moved along with the carriage 42. For driving the carriage 42 and the movable comb portion 40, an engagement member 44 may be provided that is coupled to the carriage 42. For operating or driving the movable comb portion 40 with respect to the blade set 16 (refer to FIG. 1), an adjustment drive 50 may be provided which may also be referred to as adjustment powertrain. In other words, the adjustment drive 50 may be regarded as a motorized adjustment drive 50.

The adjustment drive 50 may comprise an actuator 52 or, more particularly, an electromotor. The actuator 52 may be coupled to a reduction gear 54. The reduction gear 54 may be coupled to a transmission element 56. Generally, the transmission element 56 may be arranged to convert a rotational output motion of the actuator 52 and the reduction gear 54, if any, into a basically longitudinal positioning motion of the movable comb portion 40. A respective longitudinal direction is indicated in FIG. 3 and FIG. 4 by a double arrow denoted by reference numeral 58.

As can be seen from FIGS. 3 and 4, the transmission element 56 may be arranged as threaded spindle, particularly a small pitch spindle. Consequently, the transmission element 56 may be arranged to be set into rotational movements, refer to the curved arrow denoted by reference numeral 60 in FIG. 3. The transmission element 56 may be configured to engage the engagement member 44 so as to push or pull the carriage 42 and, consequently, the movable comb portion 40. In some embodiments, the transmission element 56 may be arranged as gear rack element. In some embodiments, the transmission element 56 may be arranged as push rod element. Generally, the actuator 52 may be mechanically connected to the carriage 42 and, in the mounted state, to the movable comb portion 40.

For operating the adjustment drive 50, respective control elements may be provided. To this end, the adjustment drive 50 may comprise a control unit 64 that is operable to control the actuator 52. The control unit 64 may be supplied with control signals indicating a desired adjustment procedure and a resulting state of the movable comb portion 40.

In accordance with the present disclosure, the adjustment procedure may be controlled by the user by simply moving the appliance 10. Movements and/or orientation changes of the housing 12 of the appliance 10 may be detected by a sensor unit 66 that involves at least one movement sensor 68. The at least one movement sensor 68 may be arranged as a gravity sensor and/or an acceleration sensor. Further, the sensor unit 66 may comprise a set of movement sensors 68. The movement sensor 68 may be arranged as a multi-axes sensor that is operable to detect movements along or about more than one axis. For instance, movements of the appliance 10 may involve translational movements along at least one axis of a set of three axes. Similarly, movements of the appliance 10 may involve rotational movements about at least one axis of a set of three axes.

This sensor unit 66 is arranged to convert respective absolute and/or relative overall movements of the appliance 10 into a control signal for the control unit 64.

Hence, an overall movement (indicated in FIG. 4 by a curved double-arrow 70) may be used to control the adjustment procedure, refer to the double-arrow 58 that indicates a displacement of the movable comb portion 40, refer to the dashed representation of the movable comb portion 40' in an extracted state in FIG. 4.

In at least some embodiments, a mode control element 74 is provided which is operable to set the appliance 10 into a length adjustment mode. In other words, the mode control element may activate and deactivate the length adjustment mode. Preferably, in certain embodiments, only in the length adjustment mode, a respective overall movement 70 of the appliance 12 would cause an adjustment operation of the adjustment drive 50. When the length adjustment mode is deactivated, any movement of the appliance 10 will not induce a length adjustment operation.

The mode control element 74 may be arranged as a touch-sensitive and/or a proximity-sensitive control element 74. The mode control element 74 may include at least one switch, button, proximity sensor, touch sensor, etc. Preferably, the mode control element 74 is also operable to confirm a selected length setting. However, in alternative embodiments, a separate control element for confirming the selected adjustment state may be provided. Further, in another exemplary embodiment, separate activation and deactivation switches for the length adjustment mode may be provided.

The sensor unit 66 may be arranged to detect multi-dimensional movements and orientation changes of the appliance 10. However, it may be advisable to focus on selected movement components so as to further simplify and clarify the control of the length adjustment drive 50. For instance, a pitch movement which basically corresponds to the movement indicated by the curved double arrow 70 in FIG. 4 may be used to control the adjustment operation. For instance, a forward pitch movement (tip-down movement or counterclockwise movement in FIG. 4) may trigger a length enlargement. By contrast, a rearward pitch movement (tip-up movement or clockwise movement in FIG. 4) may initiate a length reduction. Also an opposite assignment between rotation characteristics and length adjustment may be envisaged.

The sensor unit 66 may be coupled with the control unit 64. The control unit 64 may be provided with an adjustment control signal that is delivered from the sensor unit 66. The adjustment control signal may be also referred to as user input signal. The control unit 64 may monitor the sensor unit 66. The control unit 64 may comprise a processing unit. The control unit 64 may convert the detected adjustment control signal into an actuator operating signal that may be transferred to the actuator 52. Consequently, there is no direct electric power transmission link or direct force transmission link between the movable comb portion 40 and the sensor unit 66. Rather, electric/electronic signals may be transferred from the sensor unit 66 to the actuator 52 via the control unit 64.

As indicated above, the adjustment control signal obtained by the sensor unit 66 may be indicative of extended information, such as input speed, input acceleration, input displacement, input direction and respective information derivable therefrom. Based on the extended information, the control unit 64 may process a resulting actuator operating signal that can be used to operate the actuator 52.

The appliance 10 may be moved in opposite longitudinal directions and/or angular directions, and the control unit 64 may be configured to derive a corresponding user input direction from the adjustment control signal. As a result, the control unit 64 may operate the actuator 52 of the displacement drive 50 so as to either extend or retract the movable comb portion 40, depending on the user input detected direction.

Alongside the detection of the user input direction, the control unit 64 may derive a desired length adjustment value from the adjustment control signal. The length adjustment value may be derived from the input (angular) speed and/or the input (angular) length sensed by the sensor unit 66. Consequently, the control unit 64 may operate the actuator 52 accordingly so as to induce a desired length adjustment action.

Figure 5:
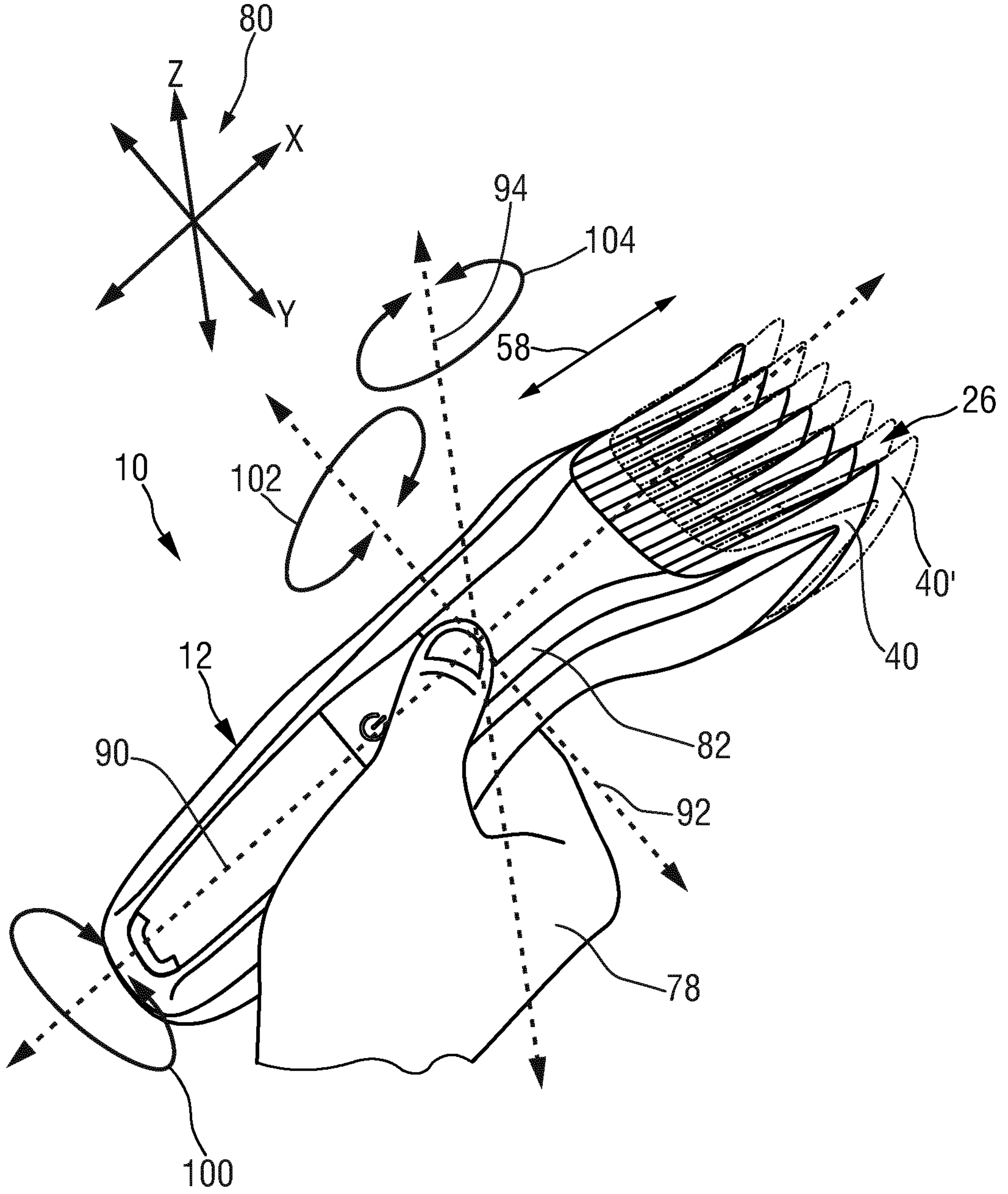
FIG. 5 is a schematic perspective view of an exemplary hair cutting appliance fitted with an adjustable spacing comb, the hair cutting appliance being held by a user that may operate an adjustment drive for the spacing comb, and wherein an extended state of the adjustable spacing comb is illustrated by dashed lines.

Further reference is made to FIG. 5, illustrating a perspective view of a haircutting appliance 10 shown in a state grasped and held by a user's hand 78. For ease of reference, a coordinate system 80 is shown in FIG. 5. The coordinate system 80 involves three main axes X, Y, Z.

Similarly, main axes of the appliance 10 are illustrated in FIG. 5. The main axes cross one another in a central portion 82 of the housing 12 of the appliance 10. The axes involve a longitudinal axis 90 which is basically parallel to the X-axis. Further, a lateral axis 92 is provided which basically corresponds to the axis Y. Further, a height axis 94 is provided which basically corresponds to the Z-axis. The longitudinal axis 90 describes a main elongation extension direction of the appliance 10. The lateral axis 92 describes a lateral extension (width) direction of the appliance 10. In FIG. 5, the lateral axis 92 describes the second largest main extension direction of the appliance 10. The height axis 94 describes a smallest extension (height) direction of the appliance 10.

Further, in accordance with an exemplary convention, the longitudinal axis 90 may be referred to as roll axis. The lateral axis 92 may be referred to as pitch axis. The height axis 94 may be referred to as yaw axis 104.

The axes 90, 92, 94 are basically perpendicular to one another. A rotation about the axis 90 may be referred to as roll movement, refer to the curved double arrow 100. A rotation about the axis 92 may be referred to as pitch movement, refer to the curved double arrow 102. A rotation about the axis 94 may be referred to as yaw movement, refer to the curved double arrow 104.

A multi-dimensional movement of the appliance 10 may be described with reference to the axes 90, 92, 94 which represent three translational degrees of freedom and three rotational degrees of freedom. Hence, the movement may involve a translational movement along at least one of the axis 90, 92, 94. Further, a rotational movement about at least one of the axes 90, 92, 94 may be involved.

In an exemplary embodiment, the sensor unit 66 (refer to FIG. 4) is capable of detecting the pitch movement 102 of the appliance which may be induced by a wrist movement of the user. The pitch movement 102, depending on the rotation direction, may cause an extraction and/or a retraction of the movable comb portion which is shown in FIG. 5 in two states (retracted state 40, solid lines, and extracted state 40', dashed lines).

An association of the pitch movement 102 and the respective length adjustment procedure for the spacing comb 26 is intuitive and easy to learn for the user. Hence, by moving the appliance 10, the user may readily notice a result, namely a corresponding movement of the movable comb portion 40, refer to the adjustment movement axis 58.

As indicated above, in at least some embodiments, the adjustment drive 50 is augmented by a mode control element 74 (refer to FIG. 4). Hence, the user may deliberately activate and deactivate a length adjustment mode. In FIG. 5, the mode control element 74 is hidden and/or covered by the housing portion 12 of the appliance 10.

Figure 6:
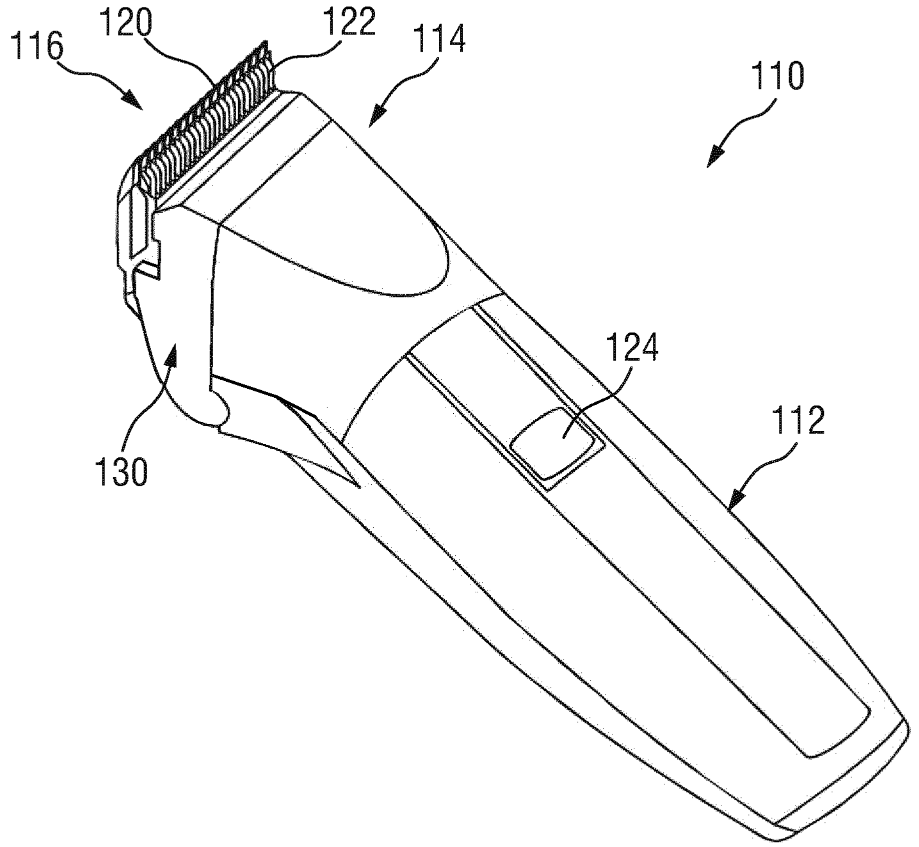
FIG. 6 shows a schematic perspective view of an exemplary embodiment of an electric hair cutting appliance arranged as a hair clipper.
Figure 7:
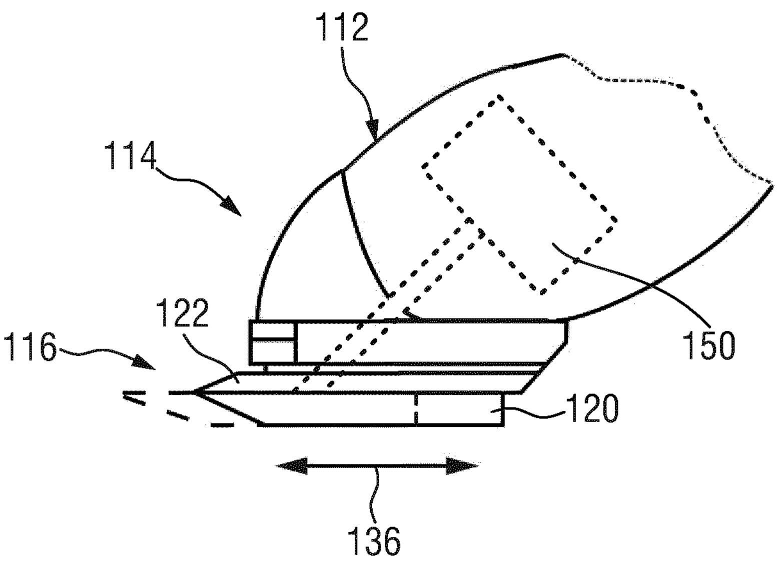
FIG. 7 shows a simplified schematic side view of an exemplary embodiment of a cutting length adjustment mechanism for a hair cutting appliance as shown in FIGS. 6.

FIG. 6 shows a schematic perspective rear view of another exemplary embodiment of a hair cutting appliance 110, particularly an electrically operated hair cutting appliance. FIG. 7 is a simplified partial side view of a frontal portion of the appliance 110.

The appliance 110 may also be referred to as hair clipper or hair trimmer. The appliance 110 comprises a housing or housing portion 112 having a generally elongated shape. At a first, top end thereof, a cutting unit 114 is provided. The cutting unit 114 comprises a blade set assembly 116. The blade set assembly 116 comprises a stationary blade 120 and a movable cutter blade 122 that may be moved with respect to each other to cut hair. At a central portion and a second, bottom end of the housing 112, a handle or grip portion is formed. A user may grasp or grab the housing 112 at the grip portion. The appliance 110 in accordance with the exemplary embodiment of FIG. 6 further comprises operator controls. For instance, an on-off switch or button 124 may be provided.

For illustrative purposes, the housing 112 of the hair cutting appliance 110 comprises a top side, where the blade set 116 is mounted, a bottom side that is opposite to the top side, a front side which typically faces the skin of the to-be-groomed subject when the appliance 110 is in operation, and a rear side that is opposite to the front side. These and other positional and/or directional indications shall not be construed as limiting the scope of the disclosure.

In accordance with the embodiment illustrated in FIGS. 6 and 7, a cutting length adjustment mechanism 130 for the blade set 116 is provided. Hence, the cutting length adjustment mechanism 130 is arranged as a tip-to-tip adjustment mechanism for the stationary blade 120 and the movable cutter blade 122 of the blade set 116.

The adjustment mechanism 130 is motor powered. Generally, the adjustment mechanism 130 may be arranged as a tip to tip adjustment mechanism that sets and adjusts a distance between the tips of the stationary blade 120 and the cutter blade 122. Hence, an offset in the frontal direction between toothed leading edges of the stationary blade 120 and the cutter blade 122 may be adjusted. When the stationary blade 120 is at least partially tapered toward the frontal end, the tip to tip adjustment also involves a cutting length adjustment.

Further reference in this context is made to FIG. 7, schematically illustrating an operation of an adjustment mechanism 130. FIG. 7 shows a simplified view of a cutting unit 114 of a hair cutting appliance 110. At or adjacent to the cutting unit 114, the appliance 110 is provided with the adjustment mechanism 130 that may be generally arranged in a fashion similar to the embodiments of the adjustment mechanism 24 explained with reference to FIGS. 3 and 4. In FIGS. 3 and 4, a movable comb portion 40 is provided which is actuated by an adjustment drive. In FIG. 7, an adjustment drive 150 is indicated which is operable to actuate the stationary blade 120 with respect to the housing 112 and/or the cutter blade 122 of the appliance 110. Hence, the stationary blade 120 may be referred to as movable portion of the adjustment mechanism 130.

The stationary blade 120 can be moved by the adjustment mechanism 130 between a first state and a second state. In FIG. 7, the first state is indicated by continuous lines. The second state is indicated by dashed lines. The first state is associated with a first, retracted state of the stationary blade 120. The second state is associated with a second, extracted state of the stationary blade 120 which is indicated in FIG. 7 by dashed lines. A double arrow designated by reference numeral 136 indicates the adjustment movement between the stationary blade 120 and the cutter blade 122. Hence, a distance between the leading edges of the stationary blade 120 and the cutter blade 122 can be adjusted which involves a cutting length adjustment, as the stationary blade 120 is slightly tapered towards the frontal end.

The stationary blade 120 and the movable cutter blade 122 of the blade set 116 are arranged in such a way that a sliding adjustment movement therebetween in the adjustment movement direction 136 in enabled.

In respect of the detailed design and configuration of the adjustment mechanism 130 and in respect of control approaches in the context of the adjustment (length setting) operation, explicit reference is made to the embodiments discussed herein that implement an adjustment mechanism for an adjustable spacing comb. Features and aspects discussed in connection therewith may be readily implemented in the general arrangement of a tip-to-tip adjustment mechanism as shown in FIGS. 6 and 7.

Figure 8:
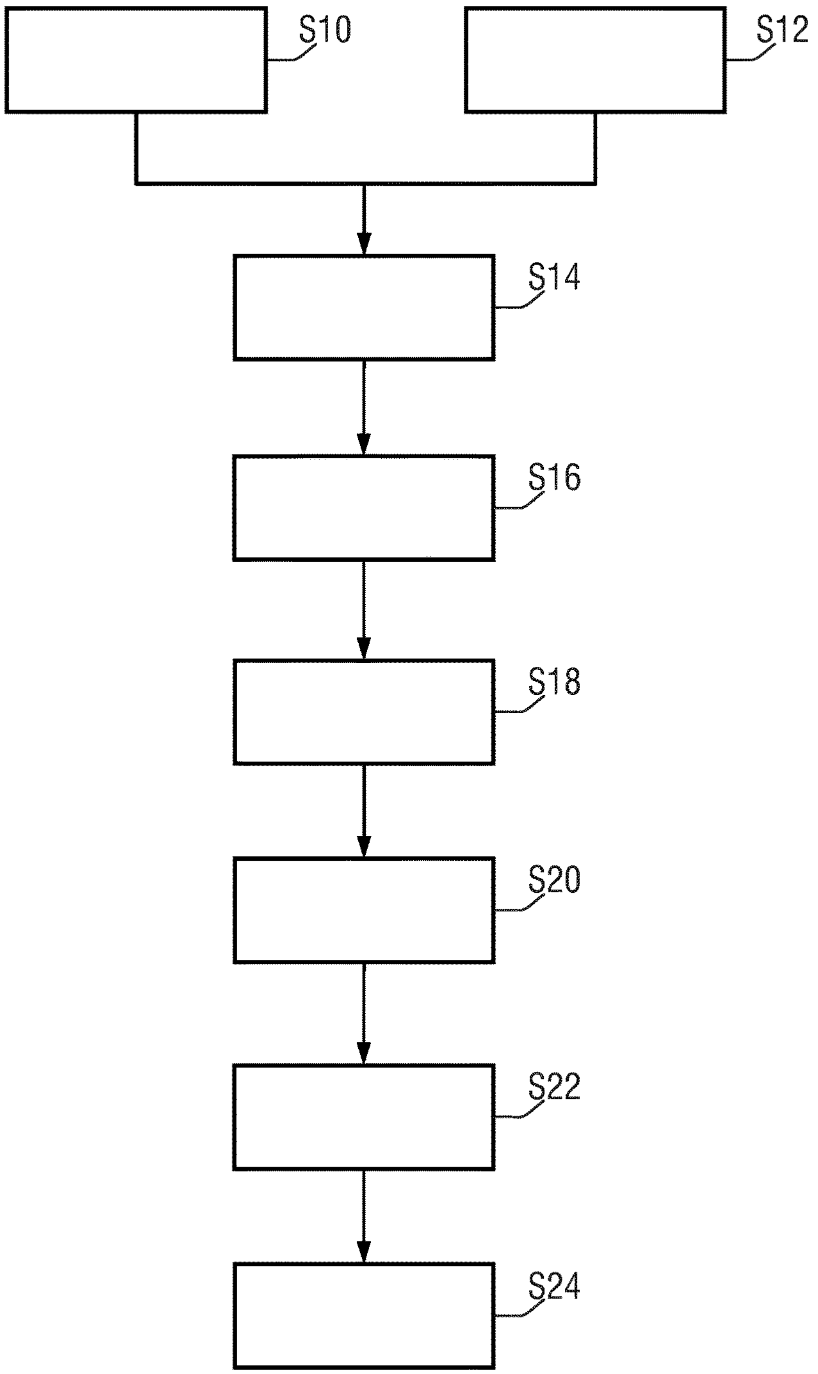
FIG. 8 shows an illustrative block diagram representing several steps of an embodiment of an exemplary method of operating a cutting length adjustment mechanism for a hair cutting appliance in accordance with several aspects of the present disclosure.

Further reference is made to FIG. 8, illustrating an exemplary method of operating a cutting length adjustment mechanism, particularly an adjustable spacing comb or an adjustable blade set, for a hair cutting appliance. The method involves a step S10 comprising a provision of an adjustment drive which involves an actuator that is capable of actuating/driving a movable portion of the cutting length adjustment mechanism with respect to a housing portion of the appliance. Consequently, the cutting length adjustment mechanism may be referred to as a powered or motorized cutting length adjustment mechanism.

The method may further include a step S12 which comprises a provision of a movement sensor unit. The movement sensor unit is configured to detect a movement of the hair cutting appliance, particularly an overall movement of a housing of the appliance. The movement of the appliance involves at least one of an orientation change and a position change. The movement sensor unit comprises at least one movement sensor which may be arranged as an acceleration sensor and/or a gravity sensor. Further types of movement sensors may be envisaged.

Generally, the movements of the appliance that are detected by the movement sensor unit may be used to control the actuator and, as a consequence, the adjustment operation of the cutting length adjustment mechanism. In other words, a user may grasp the appliance and may move the housing thereof which may particularly involve a rotation. In this way, the user may define a desired length setting of the spacing comb or the adjustable blade set without the need of actuating complex input and control elements. An intuitive control of the length adjustment and the resulting length setting is enabled in this way.

The method further includes a step S14 comprising an activation of a length adjustment operation. This may involve operating a mode control element, for instance a mode control switch or sensor. Once the length adjustment mode is activated, an overall movement of the appliance may trigger a respective length adjustment procedure.

The method may proceed with a step S16. The step S16 involves a deliberate defined control movement of the appliance by the user. For instance, the movement may involve a pitch movement, e.g. a rotation of the housing of the appliance about a pitch axis that is perpendicular to a main adjustment direction or travel direction of the spacing comb or the adjustable blade set.

In a corresponding step S18, absolute and/or relative movements of the appliance may be detected by the movement sensor unit. In a further step S20, an input operation (i.e. the overall control movement) may be converted into a corresponding control command for the actuator of the adjustment drive. Hence, the step S20 may result in the provision of a control command or signal that represents a defined length adjustment value or operation.

In a subsequent step S22, the actuator for the adjustment drive may be operated accordingly. Hence, a movable portion of the cutting length adjustment mechanism may be moved at a defined adjustment speed, for a predefined operation time and/or to a defined adjustment position.

As a consequence, in a further step S24, the length adjustment is accomplished as the movable portion is moved in accordance with the adjustment command signal. The step S24 may also involve a deactivation of the length adjustment mode. This may further involve a confirmation of a present adjustment state.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. An adjustment drive for a cutting length adjustment mechanism for a hair cutting appliance, the adjustment drive comprising:

an actuator configured to have both of a standard mode or a cutting length adjustment node, wherein in the cutting length adjustment mode, the actuator is configured to actuate a movable portion of the cutting length adjustment mechanism with respect to a housing portion of the hair cutting appliance, and a movement sensor unit configured to:

detect a movement of the hair cutting appliance, said movement of the hair cutting appliance comprising at least one of: an orientation change and a position change, determine an adjustment control signal based on a rate of change and direction of said detected movement of said hair cutting appliance; and output said adjustment control signal derived from the detected movement, wherein in the standard mode involving a cutting action, the actuator is deactivated, wherein, in the cutting length adjustment mode, the actuator is operated on the basis of the adjustment control signal, and wherein when the movement sensor detects at least one of: a forward rotation of the hair cutting appliance: a rearward rotation of the hair cutting appliance; a speed of rotation of the hair cutting appliance; and a rotation angle of the hair cutting appliance, and the actuator is operating in the cutting length adjustment mode, the adjustment control signal causes a length adjustment of the cutting length adjustment mechanism.

2. The adjustment drive as claimed in claim 1, wherein the movement sensor unit comprises:

at least one movement sensor comprising at least one of: an accelerometer sensor and a gyroscope sensor.

3. The adjustment drive as claimed in claim 1, wherein the movement sensor unit is configured to:

detect one of: an absolute orientation change and an absolute position change of the hair cutting appliance with respect to an overall reference frame, wherein said reference frame is based on a gravity system.

4. The adjustment drive as claimed in claim 1, wherein the movement sensor unit is configured to:

detect one of: a relative orientation change and position change of the hair cutting appliance with respect to a previous orientation or position of said hair cutting appliance.

5. The adjustment drive as claimed in claim 1, wherein the movement sensor unit is configured to:

detect at least one of a pitch movement, a roll movement and yaw movement of the hair cutting appliance, wherein a roll axis is aligned with a main elongation direction of the hair cutting appliance, wherein a pitch axis is perpendicular to the roll axis and basically parallel to a leading edge of the blade set hair cutting appliance, and wherein a yaw axis is perpendicular to the roll axis and perpendicular to the pitch axis.

6. The adjustment drive as claimed in claim 1, wherein when the movement sensor detects the forward rotation of the hair cutting appliance and the actuator is operating in the cutting length adjustment mode, the adjustment control signal causes a length enlargement of the cutting length adjustment mechanism, and wherein when the movement sensor detects the rearward rotation hair cutting appliance of the hair cutting appliance and the actuator is operating in the cutting length adjustment mode, the adjustment control signal causes a length reduction of the cutting length adjustment mechanism.

7. The adjustment drive as claimed in claim 1, wherein when the movement sensor detects the speed of rotation of the hair cutting appliance and the actuator is operating in the cutting length adjustment mode, said adjustment control signal causing one of: an adjustment speed and a length adjustment increment based on said detected speed of rotation of the hair cutting appliance.

8. The adjustment drive as claimed in claim 1, wherein when the movement sensor detects the rotation angle of the hair cutting appliance and the actuator is operating in the cutting length adjustment mode, said adjustment control signal causing one of: an adjustment speed and a length adjustment increment based on said detected rotation angle of the hair cutting appliance.

9. The adjustment drive as claimed in claim 1, wherein length adjustment settings are assigned to rotation orientation states of the hair cutting appliance.

10. The adjustment drive as claimed in claim 1, further comprising:

a control unit configured to control operation of the adjustment drive by converting the adjustment control signal into an actuator operating signal.

11. A cutting length adjustment mechanism for a hair cutting appliance, comprising:

a movable portion movable with respect to a housing portion of the hair cutting appliance; and an adjustment drive comprising:

an actuator configured to have both of a standard mode or a cutting length adjustment mode, wherein in the cutting length adjustment mode, the actuator is configured to actuate said movable portion of the cutting length adjustment mechanism with respect to said housing portion of the hair cutting appliance, a movement sensor unit configured to:

detect a movement of the hair cutting appliance, said movement of the hair cutting appliance comprising at least one of: an orientation change and a position change:

determine an adjustment control signal based on a rate of change and direction of said detected movement of said hair cutting appliance; and output said adjustment control signal derived from the detected movement, wherein in the standard mode involving a cutting action, the actuator is deactivated;

wherein, in the cutting length adjustment mode, the actuator is operated on the basis of the adjustment control signal, and wherein when the movement sensor detects at least one of: a forward rotation of the hair cutting appliance; a rearward rotation of the hair cutting appliance; a speed of rotation of the hair cutting appliance; and a rotation angle of the hair cutting appliance, and the actuator is operating in the cutting length adjustment mode, the adjustment control signal causes a length adjustment of the cutting length adjustment mechanism.

12. A hair cutting appliance comprising:

a housing portion, a cutting unit including a blade set, and a cutting length adjustment mechanism as claimed in claim 11.

13. The hair cutting appliance as claimed in claim 12, further comprising:

a mode control element configured to set the adjustment drive into the cutting length adjustment mode or the standard mode.

14. The hair cutting appliance as claimed in claim 12, wherein the movement sensor unit is configured to:

detect a free rotation of the hair cutting appliance about a central portion of the housing portion.

15. A method of operating a cutting length adjustment mechanism for a hair cutting appliance, the method comprising acts of:

providing an adjustment drive comprising an actuator for actuating a movable portion of the cutting length adjustment mechanism, providing a movement sensor configured to detect a movement of the hair cutting appliance, involving at least one of an orientation change and a position change, providing both of a standard mode, wherein a movement of the hair cutting appliance occurs while cutting hair without producing a corresponding change in a cutting length of the hair cutting appliance, or a cutting length adjustment mode, wherein the movement of the hair cutting appliance is provided for producing the corresponding change in the cutting length, wherein during the cutting length adjustment mode, the method comprising acts of:

detecting a movement of the hair cutting appliance;

determining an adjustment control signal based on at least one of a rate of change and a direction of said detected movement of said hair cutting appliance;

operating the actuator to change the cutting length of the hair cutting appliance based on the adjustment control signal, wherein when the movement of the hair cutting appliance is at least one of a forward rotation of the hair cutting appliance; a rearward rotation of the hair cutting appliance; a speed of rotation of the hair cutting appliance; and a rotation angle of the hair cutting appliance, and the actuator is operating in the length adjustment mode, the adjustment control signal causing a length adjustment of the cutting length adjustment mechanism.

* * * * *